United States Patent Office 3,535,300
Patented Oct. 20, 1970

3,535,300
FLAME RESISTANT POLYCARBONATES
Clarence Louis Gable, Bridgeville, Pa., assignor to Mobay Chemical Company, Pittsburgh, Pa., a corporation of Delaware
No Drawing. Filed Oct. 12, 1967, Ser. No. 674,751
The portion of the term of the patent subsequent to Oct. 28, 1986, has been disclaimed
Int. Cl. C08g 51/60, 51/62
U.S. Cl. 260—29.1
10 Claims

ABSTRACT OF THE DISCLOSURE

A flame resistant polycarbonate containing halogen atoms and a metallic salt having the formula $M(X)_n$ wherein M is a metal, X is a radical selected from the group consisting of organic dithiocarbamates, carboxylic acids, mercaptobenzothiazoles, acetyl acetonate and halogen and N is the valence of M; the halogen atoms being present at a concentration of from about 0.01 to about 1 percent by weight based on the weight of the polycarbonate and the metal salt being present at a concentration of from about $0.2 \times 10^{-5}$ to about $100 \times 10^{-5}$ mol percent of the constituent M of the formula based on the mol percent of the polycarbonate.

This invention relates to polycarbonates, particularly to flame resistant polycarbonates, and more particularly to self-extinguishing polycarbonate compositions.

Polycarbonates derived from reactions involving organic dihydroxy compounds and carbonic acid derivatives have found extensive commercial application because of their excellent physical properties. These thermoplastic polymers appear to be particularly suitable for the manufacture of molded products where impact strength, rigidity, toughness and excellent electrical properties are required. However, since these polymers exhibit a brief though definite burning time when contacted with an open flame, they are considered only semi-self-extinguishing. Further, when stabilizers or other additives normally used in the production of polycarbonates are incorporated into such semi-self-extinguishing polymers, the normal semi-self-extinguishing property of the plastic is modified or diluted to such an extent that these polycarbonates may not be sufficiently flame resistant for applications where high temperatures and/or exposure to fire may be required.

In an attempt to increase the flame resistance of polymers, stabilizers and functional additives such as monomeric phosphites, phosphoric acid esters, thiophosphoric acid esters containing halogenated alkyl radicals and halogenated organic compounds have been incorporated into them. However, in order to obtain any noticeable results, these stabilizers have had to be employed in such large quantities that they adversely affect some of the desirable physical and mechanical properties of the polymers such as impact strength, hydrolysis resistance and so on. Although other types of phosphorous compounds have been employed as flame retarding agents, they have been found to possess the same inherent disadvantages as the monomeric phosphites and phosphoric acid esters.

It is therefore an object of this invention to provide a self-extinguishing, flame resistant polycarbonate and a method for making it which is devoid of the foregoing disadvantages.

Another object of this invention is to provide a stabilized, self-extinguishing polycarbonate wherein the physical and mechanical properties of the original polymer remain substantially unmodified.

A further object of this invention is to provide a method for preparing self-extinguishing polycarbonates.

A still further object of this invention is to provide a method for incorporating flame retardants into a polycarbonate resin without modifying its physical properties.

The foregoing objects and others which will become apparent from the following description are accomplished in accordance with this invention, generally speaking, by providing a flame resistant and self-extinguishing polycarbonate composition having incorporated therein organically bound halogen atoms and a metal salt. The compound containing the organically bound halogen atom or atoms is preferably included in the polycarbonate composition as an additive or impurity, although it may also be part of the polycarbonate polymeric chain. Whether the halogenated organic compound is present as an additive, impurity or as a substituent of the polymer chain, it should be incorporated or added in such amounts that from about 0.01 to about 1 percent, and preferably from about 0.05 to 0.5 percent by weight of the halogen moiety of the compound, based on the weight of the polycarbonate is used. The metal salt should be added or incorporated at concentrations of from about $0.2 \times 10^{-5}$ to about $100 \times 10^{-5}$ mol percent of the metal moiety of the salt molecule, based on the polycarbonate. It is to be understood that when the metal salt is a metal halide, the halogen atom of the salt is not organically bound as described herein and therefore does not function to satisfy the criticality of the instant invention with regard to the concentration of halogen atoms which must be present to yield the described synergistic effect.

The process of the invention includes preparing a flame resistant and self-extinguishing polycarbonate by adding a metallic salt to a polycarbonate containing halogen atoms in its polymeric structure, or else to a polycarbonate to which is also added at least about 0.01 percent by weight of the halogen moiety of a halogenated organic compound, the amount of the metallic salt added being sufficient to render the composition flame resistant.

The essence of the invention resides in the fact that heretofore it had been necessary to incorporate metal salts or great quantities of halogen additives into polymers to make them even slightly flame resistant. (Often concentrations as high as 10 percent and at least about 3 to 5 percent of the halogen moiety of the additive had to be used to be even slightly effective.) Now, by means of the combination of the minute amounts of metal salts and the very small concentrations of halogen as described herein, a synergistic effect results by which flame resistant and self-extinguishing polycarbonate materials can be readily obtained. This synergistic result is of significant import since it precludes the necessity for the addition of great quantities of so-called "flame retardants" to polycarbonates and allows the physical and mechanical properties of such polymers to be preserved substantially intact. The synergistic effect of the combination of the metallic salts and the halogen atoms as described herein also makes possible a higher degree of flame resistance than had been obtainable heretofore.

The flame resistant or "self-extinguishing" properties referred to herein characterize a material which may burn when a flame is applied but which will extinguish itself when the flame is removed. A test for determining the self-extinguishing properties of a plastic is described by Underwriters' Laboratories, Incorporated in their memorandum bulletin, Subject 94, "Burning Tests of Plastics," Dec. 9, 1959. In this test, molded specimens ¼" x ½" x 6" and ¹⁄₁₆" x ½" x 6" are placed in a vertical position so that their lower end is ⅜" above the top of the Bunsen burner tube and the flame of the burner is adjusted to produce a blue flame ¾" in height. The test flame is placed centrally under the lower end of the test specimen and allowed to remain for 10 seconds.

The test flame is then withdrawn, and the duration of flaming or glowing combustion of the specimen noted. If flaming or glowing combustion of the specimen ceases within 30 seconds after removal of the test flame, the test flame is again placed under the specimen for 10 seconds immediately after flaming or glowing combustion of the specimen stops. The test flame is again withdrawn, and the duration of flaming or glowing combustion of the specimen noted.

The duration of flaming or glowing combustion of any single specimen after application of the test flame shall not exceed 30 seconds and the average of three specimens (six flame applications) shall not exceed 25 seconds. Furthermore, the specimen shall not be completely consumed in the test. In other words, 100 percent of all specimens tested in both ¼" and ⅟₁₆" thicknesses must pass the 30-second test. These requirements apply to the specimens tested both before and after aging in an oven at 70° C. (158° F.) for 7 days.

Materials which comply with the above requirements but drip flaming particles or droplets which burn only briefly during the test are classified as "self-extinguishing, Group II" plastics.

Any suitable organic compound containing halogen atoms may be used in the practice of this invention provided that, where the organic compound is used as an additive and is not intended to be a reactant, it is non-reactive with the polycarbonate or any other component of the composition. With this proviso, the halogenated organic compound may be present in the polycarbonate composition as a portion of the polymer when used as one of the major reactants or as a chain terminator, for example; it may also be present as an additive in the polycarbonate composition or as an impurity in the polycarbonate such as, for example, the impurity of a residual solvent.

When the halogen atoms are to be present as substituents of the polycarbonate polymer itself, halogenated reactants are included in the reaction mixture from which the polycarbonate is being prepared. Thus a halogenated dihydroxy compound may be included in the reaction mixture in addition to the conventional polycarbonate precursors and, upon the addition of a polycarbonate-forming derivative of carbonic acid under suitable reaction conditions, a copolycarbonate is formed wherein the divalent radicals derived from the halogenated dihydroxy compound and from the polycarbonate precursor are linked together through divalent carbonate radicals.

When the halogen atoms are present in the polycarbonate as a substituent of the polymer, they may be introduced into the reaction mixture by means of halogenated dihydroxy compounds which may be represented generically by the formula

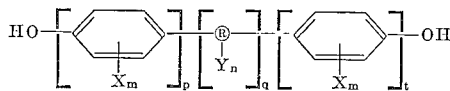

wherein Y is a monovalent hydrocarbon radical, for example, alkyl radicals (e.g., methyl, ethyl, propyl, isopropyl, butyl, decyl, etc.), aryl radicals (e.g., phenyl, naphthyl, biphenyl, tolyl, xylyl, etc.), aralkyl radicals (e.g., benzyl, ethylphenyl), cycloaliphatic radicals (e.g., cyclopentyl, cyclohexyl, etc.), as well as monovalent hydrocarbon radicals containing inert substituents therein, such as halogen (chlorine, bromine, fluorine, etc.). It will be understood that where more than one Y is used, they may be the same or different. R is selected from the group consisting of an alkylene and alkylidene group such as methylene, ethylene, propylene, propylidene, isopropylidene, isobutylidene, butylidene, amylene, isoamylene, amylidene, isoamylidene, cyclohexylidene, etc. R may also be a polyalkoxy group such as polyethoxy, polypropoxy, polythioethoxy, polybutoxy, polyphenylethoxy and the like. R may also consist of two or more alkylene or alkylidene groups such as above, separated by an aromatic group, an ether linkage, a carbonyl group or by a sulphur containing group such as sulphide, sulphoxide, sulphone, etc. X is a substituent selected from the group consisting of inorganic atoms, inorganic radicals and organic radicals which are inert to and unaffected by the reactants and by the reaction conditions. Among the substituents represented by X are halogen, e.g., chlorine, bromine and fluorine, etc., or oxy radicals of the formula OZ where Z is a monovalent hydrocarbon radical similar to Y or monovalent hydrocarbon radicals of the type represented by Y. However, in all cases at least one X and preferably two or more of the X's represent halogen groups, $m$ is a whole number including zero to a maximum equivalent to the number of replaceable nuclear hydrogens substituted on the nuclear ring, $n$ is a whole number including 0 to a maximum determined by the number of replaceable hydrogens on R, $q$ ranges from 0 to 1, $p$ and $t$ are whole numbers including 0. When $q$ is zero, however, either $p$ or $t$ may be 0 but not both. Examples of halogen containing dihydric phenol compounds which may be used in this invention include 2,2-(3,5,3',5'-tetrachloro-4,4'-dihydroxydiphenyl) propane,
2,2-(3,5,3',5'-tetrabromo-4,4'-dihydroxydiphenyl) propane,
(3,3'-dichloro-4,4'-dihydroxydiphenyl)methane,
2,2'-dihydroxy-5,5'-difluorodiphenyl methane,
1,1-bis(4-hydroxy-2-chlorophenyl)ethane,
5'-chloro-2,4'-dihydroxydiphenyl sulphone,
5'-chloro-2',4-dihydroxydiphenyl sulphone,
3'-chloro-4,4'-dihydroxydiphenyl sulphone,
3'-chloro-4',4'-dihydroxydiphenyl sulphone,
4'-dihydroxy-3,3'-dichlorodiphenyl ether,
4,4'-dihydroxy-3,3'-difluorodiphenyl ether,
4,4'-dihydroxy-2,3'-dichlorodiphenyl ether,
4,4'-dihydroxy-3,3'-dichlorodinaphthyl ether,
and the like.

Further, any other suitable halogenated polycarbonate may be employed such as, for example, those described in U.S. Pats. 3,043,800; 2,999,835; 3,028,365; 3,106,545; 3,106,546; 3,119,787; 3,141,863; 3,177,179; 3,186,961; 3,203,980; 3,220,978; 3,232,993; 3,240,756; 3,248,366; 3,251,805, and the like.

In addition to forming copolycarbonates from the dihydroxy aromatic compounds and halogen containing dihydroxy aromatic compounds, homopolymeric polycarbonates may also be formed from halogen containing dihydroxy compounds such as those enumerated above.

Where desired, the halogenated organic compound may be introduced into the polycarbonate polymeric composition as a chain terminator, whether or not the remainder of the polymer contains halogen atoms. For example, halogenated phenols having from 1 to 5 halogen groups connected to the phenol nucleus may be incorporated into the polycarbonate resin, the amount employed being dependent on the desired molecular weight as well as the minimum required concentration of halogen atoms in accordance with this invention. Generally, the chain terminating agent may be introduced into the reaction mixture in any suitable manner as described in the processes set forth in the patents mentioned herein.

When the halogen atoms are present in the composition as constituents of an additive to the polycarbonate, they may be introduced by means of any suitable halogenated compound provided that the halogenated compound is not reactive with the polycarbonate or any other component of the composition and has a boiling point high enough so that it does not volatilize at the temperatures and pressures at which the polycarbonate is processed. Preferably, the additives should have a boiling point of about 250° C. or higher at atmospheric pressure. Within this definition, any suitable halogenated organic compound which will not deleteriously affect the polycarbonate and which contains at least one halogen atom but preferably from 2 to 6 halogen groups may be used. Examples of some suitable halogenated organic compounds which may be used as additives include those mentioned hereinbefore as suitable reactants in the preparation of halogen containing polycarbonates as well as halogenated aliphatic hydrocarbons such as, for example, tetrabromobutane, tetrabromoethane, 1-bromooctane, tribromopropane, octachloropropane, hexachloroethane, tribromobutane, 1,2,3,4,5,6-hexachlorocyclohexane, and the like; suitable halogenated aromatic hydrocarbons such as, for example, chlorobiphenyl (o), (m), (p), a-naphthyl chloride, b-naphthyl chloride, p-bromoacetophenone, a-bromobiphenyl, p-bromobiphenyl, p-bromodiphenyl ether, bromoiodobenzene (o), (m), (p), a-naphthyl bromide, b-naphthyl bromide b-bromophenetole, 9-bromophenanthrene, p-iodobiphenyl, a-naphthyliodide, b-naphthyliodide, 4,4'-bromobiphenyl, 4,4'-dibromobiphenol ether, 4, 4'-dichlorobenophenone, 3,3'-dichlorobiphenyl, 4,4'-dichlorobiphenyl, 1,3-dichloronaphthalene, 1,4-dichloronaphthalene, 1,5-dichloronaphthalene, 1,7-dichloronaphthalene, 2,6 - dichloronaphthalene, o, m, and p-diiodobenzene, 1,2,4-tribromobenzene, 1,3,5-tribromobenzene, 1,2,3,5-tetrabromobenzene, penta-bromobenzene, pentachlorobenzene, chloroacenaphthene, 2,7-dibromofluorene, tetrabromophthalic anhydride, pentachloroethylbenzene, hexachlorobenzene, hexabromobenzene and the like. Corresponding chloro, fluoro, bromo and iodo isomers thereof may be used in the practice of this invention and any and all such suitable halogenated compounds are suitable in the practice of this invention and all are contemplated.

In addition, an ester containing at least one halogen atom may be used in admixture with the polycarbonate composition to impart flame resistant properties thereto. For example, the esters obtained from halogenated acids, anhydrides and monohydric alcohols or polyhydric alcohols may be used. Suitable halogenated organic esters are chloroacetic acid esters, fluoroacetic acid esters, bromoacetic acid esters, halophthalic acid esters such as dimethyl tetrabromophthalate, diethyl-tetrabromophthalate, di-n-propyl - tetrachlorophthalate, di-n-octyl - dichlorophthalate and the like and mixtures thereof.

When the halogen atoms are present in the polycarbonate composition as a substituent of an impurity in the composition, they may be introduced into the composition by means of any suitable inert organic solvent containing halogen atoms as a residual solvent impurity in accordance with this invention, whether or not the halogen-containing solvent is a polycarbonate solvent. Some such suitable solvents are, for example, sym-tetrachloroethane, methylene chloride, cis-1,2-dichloroethylene, chloroform, 1,1,2-trichloroethane, 1,2-dichloroethane, chlorobenzene, o-dichlorobenzene, 1-chloronaphthalene, epichlorohydrin, 1,1-dichloroethane, carbon tetrachloride, trichloroethylene and the like and mixtures thereof. It is to be understood that any and all solvents within the foregoing definition are operable and contemplated and that the above listing is merely illustrative and is not intended to be limitative. Further, mixtures of any of the foregoing halogenated materials may be used as well as a combination of halogenated additives or impurities and a halogen-containing polycarbonate polymer.

Metallic salts which are capable of rendering polycarbonate compositions containing halogenated organic compounds flame-resistant in accordance with this invention are represented by the general formula $$M(X)_n$$

wherein M represents a metal, X represents an anion which renders the metal soluble in the organic system and $n$ is an integer equal to the valence of the metal M. Examples of suitable metals which may be employed are those classified in Groups II, IV, VI, VII and VIII of the periodic system of elements according to the Handbook of Chemistry and Physics, 46th edition (The Chemical Rubber Company). Metals represented by M above which appeared to have the greatest effect on the flame resistance of polycarbonates are tin, lead, zinc, iron, magnesium, manganese, calcium, cadmium, cobalt and selenium. Suitable anions represented by X above which exert a solubilizing effect on the metal are organic complexes such as organic dithiocarbamates having the formula

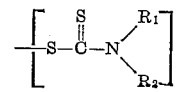

wherein $R_1$ and $R_2$ which may be the same or different are monovalent hydrocarbon radicals having from 1 to 20 carbon atoms. The hydrocarbon radicals may be alkyl, aralkyl, aryl or cycloalkyl radicals. Examples of alkyl groups are methyl, ethyl, butyl, isobutyl, pentyl and various positional isomers thereof such as, for example, 1-methylbutyl, 2-methylbutyl, 3-methylbutyl, 1,1-dimethylpropyl, 1,2-dimethylpropyl, 2,2-dimethylpropyl 1-ethylpropyl and corresponding straight and branched chain isomers of hexyl, octyl, decyl, dodecyl, tetradecyl, hexadecyl, octadecyl, eicosyl, and the like; aryl groups such as phenyl, alpha- or beta-naphthyl, alpha- or beta-anthryl and the like; aralkyl groups such as benzyl, alpha- and beta-phenylethyl, alpha- and beta-phenylbutyl, alpha-(a'-naphthyl)ethyl, alpha-(a'-naphthyl)-propyl, alpha-(a'-naphthyl)-butyl and the corresponding alpha- and beta-naphthyl derivatives of n-amyl and the various positioned isomers thereof such as 1-methylbutyl, 2-methylbutyl, 3-methylbutyl, hexyl, octyl and the like; alkaryl radicals such as o-, m-, and p-tolyl, 2,3-xylyl, 2,6-xylyl, 3,4-xylyl, o-, m-, and p-cumenyl, o-, m-, and p-ethylphenyl, 2-methyl - a - naphthyl, 3-methyl-a-naphthyl, 6-methyl-a-naphthyl, 8-ethyl-b-naphthyl, and the like and cycloalkyl radicals such as cyclopropyl, cyclobutyl, cyclohexyl, cyclooctyl, and the like.

Other anions represented by X above are carboxylic acids having the formula

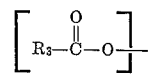

wherein $R_3$ is a saturated or unsaturated monovalent hydrocarbon radical having from 4 to 20 carbon atoms such as butyl, butenyl, hexyl, hexenyl, octyl, octenyl, decyl, decenyl, dodecyl, dodecenyl, tetradecyl, tetradecenyl, hexadecyl, hexadecenyl, octadecyl, octadecenyl, eicosyl, eicosanyl, 3,3-dimethyl-1-butenyl, 2,3-dimethyl-3-butenyl, 1-methyl-1-ethyl-2-propenyl, and the like; substituted and unsubstituted mercaptobenzothiazoles of the formula

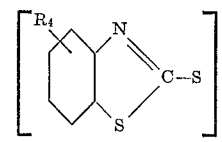

wherein $R_4$ represents hydrogen, halogen such as, for example, chloro, fluoro, bromo, iodo and the like atoms; monovalent hydrocarbon radicals having from 1 to 4 carbon atoms such as methyl, ethyl, propyl, butyl isomers thereof and the like, which may also be substituted with halogen atoms such as chlorine, fluorine, iodine, bromine and the like, and mixtures thereof.

Other anions represented by X above are the acetyl aceonates having the following formula:

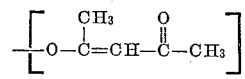

and the metallic halides such as those derived from chlorine, fluorine, bromine, iodine and the like.

Examples of suitable metallic compounds which may be used in the stabilizing system of this invention include lead dimethyldithiocarbamate, plumbous diethyldithiocarbamate, magnesium methyl-ethyl dithiocarbamate, cadmium diethyldithiocarbamate, plumbic dibutyldithiocarbamate, manganous methyl-tertiary butyldithiocarbamate, zinc diethyldithiocarbamate, zinc dibutyldithiocarbamate, calcium propylhexyl dithiocarbamate, zinc dimethyldithiocarbamate, stannous dimethyldithiocarbamate, cobalt dieicosanyldithiocarbamate, tin diethyldithiocarbamate, stannic dibutyldithiocarbamate, ferrous dipropyldithiocarbamate, selenium dimethyldithiocarbamate, ferrous dibutyldithiocarbamate, ferric dimethyldithiocarbamate, zinc dioctyldithiocarbamate, stannous dioctyldithiocarbamate, plumbous dioctyldithiocarbamate, zinc dicyclohexyldithiocarbamate, stannic dicyclopentyldithiocarbamate, stannous diphenyldithiocarbamate, plumbic dinaphthyldithiocarbamate, stannic ditolyldithiocarbamate as well as any and all combinations of the metals represented by M in the formula $$M(X)_n$$

with an organic dithiocarbamate radical as defined herein and the like.

Metal salts of carboxylic acids which are suitable as the metal-containing component of the flame extinguishing system of this invention are, for example, tin laurate, plumbous palmitate, zinc stearate, plumbous stearate, lead caprate, tin oleate, lead salt of a coconut fatty acid, ferrous valerate, ferric butyrate, manganese heptanate, maganese dieicosanate, manganese tetrabutyrate, calcium octanoate, cadmium laurate, cobaltous palmitate, cobaltic pentadecanoate, selenium tetravalerate, selenium hexastearate, a tin salt of a tall oil acid, a zinc salt of linseed oil fatty acid as well as any and all combinations of the metals represented by M in the formula $$M(X)_n$$

with a carboxylic acid radical as defined herein and the like.

Examples of metallic mercaptobenzothiazoles which may be used in the present invention are tin mercaptobenzothiazole, lead mercaptobenzothiazole, zinc mercaptobenzothiazole, iron mercaptobenzothiazole, ferrous 3-chloro mercaptobenzothiazole, ferric 4-butyl mercaptobenzothiazole, manganous 5-tetiarybutyl mercaptobenzothiazole, manganese tetra(3-bromopropyl mercaptobenzothiazole), calcium 5-fluoro mercaptobenzothiazole, cadmium 4-methyl mercaptobenzothiazole, cobaltous 3-iodo mercaptobenzothiazole, selenium tetra (3 - butyl mercaptobenzothiazole), stannous 4 - chloromethyl mercaptobenzothiazole, stannic 5(2-fluoroethyl) mercaptobenzothiazole, lead tetra(4(3 - iodopropyl)mercaptobenzothiazole), zinc 4-butyl mercaptobenzothiazole and the like.

Other metallic derivatives of organic compounds may be used in the instant invention such as, for example, ferrous acetyl acetonate, zince acetyl acetonate, stannous acetyl acetonate, plumbous acetyl aceonate, cobaltous acetyl acetonate, stannic acetyl acetonate, plumbic acetyl acetonate, ferric acetyl acetonate, magnesium acetyl acetonate, manganous acetyl acetonate, manganic acetyl acetonate, calcium acetyl acetonate, cadmium acetyl acetonate, cobaltic acetyl acetonate, selenium acetyl acetonate and the like.

Suitable metallic halides which may be used in this invention are zinc chloride, zinc bromide, plumbous chloride, plumbic fluoride, stannous chloride, stannic bromide, ferric chloride, cadmium chloride, ferrous iodide, magnesium fluoride, manganous chloride, manganic iodide, calcium bromide, cobaltic chloride, cobaltous fluoride, selenium bromide and the like.

Mixtures of any of the metallic salts referred to herein may also be used.

The concentration of the metal salt to be used will vary depending upon the polycarbonate to be stabilized and the halogen concentration of the composition. The concentration of the metal salt to be used is measured via the concentration of the constituent M in the formula $M(X)_n$ and it is a relatively simple matter to determine the appropriate concentration by experimentation. For example, a very small amount of the metal salt should be added to the polycarbonate and the amount should be gradually increased until the desired degree of flame resistance is obtained. Normally, a concentration of less than about $0.2 \times 10^{-5}$ mol percent of the constituent M (the metallic moiety of the metal salt) will not exert any flame retarding effect on the polymer while more than about $100 \times 10^{-5}$ mol percent of the constituent M based on the weight of the polycarbonate will not result in any substantial increase in the degree of flame resistance of the polymer. Preferably, from about $0.5 \times 10^{-5}$ to about $20 \times 10^{-5}$ mol percent of the constituent M based on the weight of the polycarbonate, is sufficient to impart flame resistant properties to a polycarbonate material although greater or lesser amounts may be used as desired.

The metal salts may be added to the polycarbonate composition in any suitable manner. They may be added to the polycarbonate reaction mixture before, during or after the polycarbonate polymer has been formed. They may also be added to polycarbonate solutions prior to evaporation of the solvent therefrom or they may be added to a molten polycarbonate composition. In addition, a powdered or granular polycarbonate composition may be admixed with the metallic salts, blended, and then homogenized by melt extrusion or in any other suitable manner.

In one embodiment of this invention, powdered or pelletized polycarbonate composition may be blended with from about 2 to about 50 times the amount of metallic salts necessary to render the polycarbonate composition flame resistant. The blended material may then be blended with other polycarbonate material free of metallic salts in the proportion necessary to reduce the metallic salt concentration to that level which is necessary for imparting flame resistant characteristics to the polymer.

In another embodiment of this invention, a powdered or pelletized polycarbonate composition may be blended with from about 2 to about 50 times the amount of metallic salts necessary to render it flame resistant and then extruded in the form of pellets. These pellets containing a concentrated amount of metallic salts may be blended with another powdered or pelleted polycarbonate composition in the proportion necessary to reduce the metallic salt concentration to that level which will provide the polycarbonate with flame resistant characteristics. The composition is then re-extruded and the polycarbonates thus produced may be formed into desirable articles by injection molding, extrusion or other processes known in the thermoplastic art, to prepare polycarbonate helmets, skis, windows and the like.

Although the foregoing discussion presupposes that the polycarbonate being stabilized has already had the halogenated component added thereto or incorporated therein, any desired order of addition of the components of the flame stabilizing system of this invention may be used. Hence, the metallic salt may be added to the polycarbonate composition and the halogenated polymer, halogenated additive or halogen-containing impurity may be adjusted as described in the foregoing paragraphs for the metallic salts. Further, halogenated polycarbonate polymers may be added to nonhalogenated polymers either before the metallic salt is added or while it is being added or after it is added. Conversely, a highly halogenated polymeric composition may be diluted with nonhalogen-containing polycarbonate either before, during or after the addition of the metallic salt as described herein. Alternatively, the metallic salt may be added to the halogenated additive or polymer and the combination of the two may be added as a system at the same time to the polycarbonate to be stabilized. Hence, almost infinite variety of methods for employing the stabilizing system of this invention may be used and all are contemplated.

Any suitable polycarbonate may be stabilized in accordance with this invention and the polycarbonate may be prepared in any suitable manner by any of the methods known in the art. Some suitable processes and reactants and conditions for preparing some such suitable polycarbonates are those discussed in Canadian Pats. 578,585; 578,975; 594,805 and U.S. Pats. 2,999,835; 2,999,846; 2,970,131; 2,991,273; 3,014,891; 2,964,794; 3,028,365; 3,153,008; 3,187,065; 3,215,668, and the like, as well as those discussed in the text, "Polycarbonates," by William F. Christopher and Daniel W. Fox, and in the patents cited hereinbefore.

The invention is further illustrated but is not intended to be limited by the following example in which all parts and percentages are by weight unless otherwise specified.

EXAMPLE

To a mixture containing about 548 parts of 2,2-(4,4'-dihydroxydiphenyl)-propane, about 268 parts of caustic soda, about 2,460 parts of water, about 1,320 parts of methylene chloride, about 0.48 part of sodium dithionite and about 4 parts of p-tert.-butylphenol, is added about 288 parts of phosgene with stirring at a temperature of about 25° C. over a period of about 2 hours. The mixture is stirred at room temperature for an additional 4 hours. The aqueous layer is separated and the polycarbonate solution is washed with water. The methylene chloride solvent is evaporated off and a dried friable granular polycarbonate material is thus obtained. The granular polycarbonate material is blended with varying amounts of halogenated organic compounds and metallic salts by melt extrusion and molded into ¼" x ½" x 6" test bars. The bars are then tested for flammability characteristics in accordance with Underwriters' Laboratories, Inc. procedure for determining the flammability of plastic material. The results of these tests are illustrated in the following table:

TABLE

| Additive | Parts per 10⁶ parts polycarbonate | Flammability test by UL procedure on ¼" thick specimens | |
|---|---|---|---|
| | | Percent bars passing | Average burning time (sec.) |
| (a) None | | 56 | 22 |
| (b) Ferric acetylacetonate | 63 | 100 | 9 |
| (c) Tetrabromobisphenol A-(2,2-(3, 5,3',5'-tetrabromo-4,4'-dihydroxydiphenyl)propane. | 1,000 | 43 | 24 |
| (d) 1,3,5-tribromobenzene | 1,000 | 70 | 20 |
| (e) Ferric acetylacetonate | 63 | 100 | 0.3 |
| Tetrabromobisphenol A | 1,000 | | |
| (f) Ferric acetylacetonate | 63 | 100 | 4 |
| 1,3,5-tribromobenzene | 1,000 | | |
| (g) Ferric acetylacetonate | 63 | 100 | 0.8 |
| Tetrabromobutane | 1,000 | | |
| (h) Ferric acetylacetonate | 63 | 100 | 0.5 |
| Tetrabromophthalic anhydride | 1,000 | | |
| (i) Zinc mercaptobenzothiazole | 123 | 100 | 10 |
| (j) Zinc mercaptobenzothiazole | 123 | 100 | 7 |
| Tetrabromobisphenol A | 1,000 | | |
| (k) Lead chloride | 13 | 100 | 9 |
| (l) Lead chloride | 13 | 100 | 2 |
| Tetrabromobisphenol A | 1,000 | | |

As the data for the average burning times in the preceding table readily illustrate, a synergistic effect is obtained when the combination of the metal salts and the halogen moiety as described herein is employed. For example, where the metal salt is used alone, such as for example in (b) in the preceding table, the average burning time is nine seconds; however, when a halogen moiety containing compound is combined with the metal salt as in (e) in the preceding table, the average burning time is reduced to 0.3 second. This data shows that there is a 300% improvement in part (e) over part (a).

It is to be understood that any of the components and conditions mentioned as suitable herein can be substituted for its counterpart in the foregoing example and that although the invention has been described in considerable detail in the foregoing, such detail is solely for the purpose of illustration. Variations can be made in the invention by those skilled in the art without departing from the spirit and scope of the invention except as set forth in the claims.

What is claimed is:

1. A flame resistant polycarbonate comprising a polycarbonate composition containing halogen atoms and a metallic salt having a formula $M(X)_n$ wherein M is a metal classified in Groups II, IV, VI, VII and VIII of the periodic system of elements, X is a radical selected from the group consisting of organic dithiocarbamates having the formula

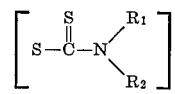

wherein $R_1$ and $R_2$ are hydrocarbon radicals having from 1 to 20 atoms; mercaptobenzothiazoles having the formula

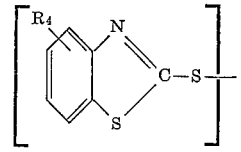

wherein $R_4$ is selected from the group consisting of hydrogen, halogen and a monovalent hydrocarbon radical having from 1 to 4 carbon atoms; acetyl acetonate having the formula

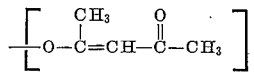

and halogen and $n$ is the valence of M; the halogen atoms being present at a concentration of from about 0.01 to about 1 percent by weight based on the weight of the polycarbonate and the metal salt being present at a concentration of from about $0.2 \times 10^{-5}$ to about $100 \times 10^{-5}$ mol percent of the constituent M of the formula based on the mol percent of the polycarbonate.

2. The polycarbonate of claim 1 wherein the constituent M in the formula $M(X)_n$ is selected from the group consisting of lead, zinc, tin, calcium and cadmium.

3. The polycarbonate of claim 1 wherein X in the formula $M(X)_n$ is an organic dithiocarbamate having the formula

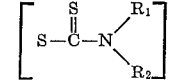

wherein $R_1$ and $R_2$ are hydrocarbon radicals having from 1 to 20 atoms.

4. The polycarbonate of claim 1 wherein X in the formula $M(X)_n$ is an acetyl-acetonate having the formula

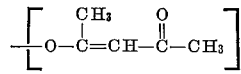

5. The polycarbonate of claim 1 wherein X in the formula $M(X)_n$ is a mercaptobenzothiazole of the formula

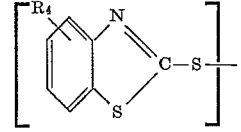

wherein $R_4$ is selected from the group consisting of hydrogen, halogen and a monovalent hydrocarbon radical having from 1 to 4 carbon atoms.

6. The polycarbonate of claim 1 wherein X in the formula $M(X)_n$ is fluorine, chlorine, bromine or iodine.

7. The polycarbonate of claim 1 wherein the halogen atoms are substituents of the polycarbonate polymer.

8. The polycarbonate of claim 1 wherein the halogen atoms are present as constituents of an additive selected from the group consisting of an aliphatic hydrocarbon, an aromatic hydrocarbon, an ester and halogen-containing residual solvent.

9. The polycarbonate of claim 1 wherein the halogen atoms are present as constituents of an additive and at a concentration of from about 0.05 to about 0.1 percent by weight of the halogen atoms of the additive based on the weight of the polycarbonate and the metal salt is present at a concentration of from about $0.5 \times 10^{-5}$ to about $20 \times 10^{-5}$ mol percent of the metal moiety.

10. The polycarbonate of claim 1 prepared by a process which comprises adding halogen atoms to the polycarbonate compositions at a concentration of about 0.01 to about 1% by weight of the polycarbonate and also adding the metal salt to the polycarbonate composition at a concentration of from about $0.2 \times 10^{-5}$ to about $100 \times 10^{-5}$ mol percent of the metal moiety of the salt and incorporating the halogen and metal salt therein.

References Cited

UNITED STATES PATENTS 3,357,942  12/1967  Jackson _____ 260—45.7
3,418,263  12/1968  Hindersinn _____ 260—23

DONALD E. CZAJA, Primary Examiner

V. P. HOKE, Assistant Examiner

U.S. Cl. X.R.

252—8.1; 260—18, 30.2, 33.8, 45.7, 45.8, 45.85, 45.9, 47